United States Patent
Sterling et al.

(10) Patent No.: US 6,841,602 B2
(45) Date of Patent: Jan. 11, 2005

(54) THERMOSET POLYMERS WITH POLYFLUOROALKYLSILOXANE MODIFIED SURFACES

(75) Inventors: Robert E. Sterling, Homosassa Springs, FL (US); Eugene P. Goldberg, Mt. Dora, FL (US)

(73) Assignee: RES Development Corporation, Lecanto, FL (US)

( * ) Notice: Subject to any disclaimer, the term of this patent is extended or adjusted under 35 U.S.C. 154(b) by 74 days.

(21) Appl. No.: 09/978,305

(22) Filed: Oct. 17, 2001

(65) Prior Publication Data

US 2002/0068788 A1 Jun. 6, 2002

Related U.S. Application Data

(60) Provisional application No. 60/240,833, filed on Oct. 17, 2000.

(51) Int. Cl.[7] ............................................. C08K 5/5419
(52) U.S. Cl. ...................... 524/264; 524/731
(58) Field of Search .................. 524/731, 264

(56) References Cited

U.S. PATENT DOCUMENTS

| | | | |
|---|---|---|---|
| 3,034,509 A | | 5/1962 | Bernstein et al. |
| 3,485,787 A | | 12/1969 | Haefele et al. |
| 3,830,767 A | | 8/1974 | Condon et al. |
| 4,123,409 A | | 10/1978 | Kaelble |
| 4,386,179 A | | 5/1983 | Sterling |
| 5,350,824 A | * | 9/1994 | Kobayashi .................... 528/21 |
| 5,635,579 A | * | 6/1997 | Evans et al. .................. 528/37 |
| 5,824,421 A | * | 10/1998 | Kobayashi et al. ......... 428/447 |
| 5,912,291 A | | 6/1999 | Sterling et al. |

FOREIGN PATENT DOCUMENTS

| | | |
|---|---|---|
| EP | 2-22201 | 5/1987 |
| JP | 60-104161 | 6/1985 |

OTHER PUBLICATIONS

Definition of "copolymer" from Encyclopedie Britanica Online, 2003.*
Definition of "polymer" from Encyclopedie Britanica Online, 2003.*
Definition of "copolymerize" from Webster's Third International Dictionary, 1993.*
Definition of "Copolymer", The Condensed Chemical Dictionary, 1971.*

* cited by examiner

Primary Examiner—Margaret G. Moore
(74) Attorney, Agent, or Firm—Miles & Stockbridge P.C.; Dennis P. Clarke

(57) ABSTRACT

A mixture comprising a cross-linkable thermosetting resin precursor and a polyfluoroalkylsiloxane curable to form a composition comprising a cross-linked thermoset resin containing the polyfluoroalkylsiloxane in a gradient concentration through a cross-section thereof.

13 Claims, No Drawings

THERMOSET POLYMERS WITH POLYFLUOROALKYLSILOXANE MODIFIED SURFACES

This application claims the benefit under 35 U.S.C. Section 119(e) of U.S. provisional application Ser. No. 60/240,833 filed Oct. 17, 2000.

BACKGROUND OF THE INVENTION

1. Field of the Invention

The present invention relates to thermoset polymers modified with certain fluorocarbon additives.

2. Description of the Prior Art

It has recently been proposed to modify thermoplastic polymers by incorporating therein various oils, gums, etc.

U.S. Pat. No. 3,485,787 discloses that certain block copolymers may be extended by incorporating mineral oil therein. U.S. Pat. No. 3,830,767 teaches that bleeding of the extending oil from the block copolymer may be prevented by incorporating a petroleum hydrocarbon wax therein.

U.S. Pat. No. 4,123,409 relates to block copolymers having thermoplastic terminal blocks and an elastomeric intermediate block. The patent discloses blending with the copolymer a high molecular weight oil which is compatible with the elastomeric block portion of the copolymer. Where the elastomeric portion is a hydrocarbon, the oil employed is a mineral oil. Where the elastomeric block is a polysiloxane, a silicone oil is blended therewith.

U.S. Pat. No. 3,034,509 discloses the addition of silicone oil to polyethylene for use as surgical tubing.

U.S. Pat. No. 4,386,179 discloses the dispersion of a polysiloxane throughout an elastomeric thermoplastic hydrocarbon block copolymer.

Japanese Patent No. 60-104161 describes an anti-friction composite material comprising a resin and more than 1.0%, by weight, of a fluorocarbon oil which have been injection molded together in a manner such that the oil exudes onto the molded surfaces of the resin due to poor compatibility of the oil with the resin and differences in viscosity between the resin and differences in viscosity between the resin and oil to produce an anti-friction surface.

European Patent No. 222,201 mentions perfluorosilicone oils for use in vulcanizable non-thermoplastic rubber compositions. Their use is said, however, to result in difficulties with respect to mixing, a reduction in the vulcanization rate and a worsening of the compression set value and thermal stability.

There is continuous research leading to the development of novel polymeric materials whose properties are tailored by incorporating therein various additives.

In application Ser. No. 07/446,675 filed Dec. 6, 1989, now abandoned, there is described a composition of matter having advantageous properties formed by melt-blending a thermoplastic polymer and from about 0.01% to less than 1.0%, by weight, of a perfluorocarbon additive, the properties of the polymer and the additive being such that, in the solid product obtained, the concentration of the perfluorocarbon additive is a gradient through a cross-section of the solid from a lower value in the interior to a higher value at the surfaces thereof.

It is an object of the present invention to provide novel thermoset polymer compositions having unique properties which find utility in a wide variety of applications.

It is another object of the invention to provide a novel method for preparing thermoset polymer compositions having properties and characteristics heretofore unattainable.

In U.S. Pat. No. 5,912,291, there is described a composition of matter having advantageous properties formed by melt-blending a thermoplastic polymer and from about 0.01% to less than about 1.0%, by weight, of a polyfluoroalkylsiloxane, followed by cooling to produce a solid polymer composition wherein the concentration of the polyfluoroalkylsiloxane is a gradient through a cross-section of the solid polymer from a lower value in the interior to a higher value at the surfaces thereof.

SUMMARY OF THE INVENTION

These and other objects are realized by the present invention, one embodiment of which provides a composition of matter comprising (1) a cross-linkable thermosetting resin providing composition intimately admixed with (2) from about 0.01 to about 5%, by weight, based on the weight of the mixture, of an additive comprising polyfluoroalkylsiloxane (PFAS) having the formula:

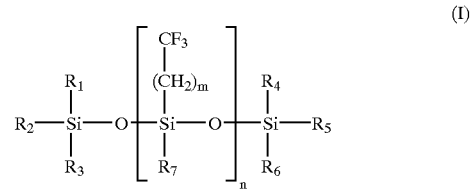

wherein $R_1$, $R_2$, $R_3$, $R_4$, $R_5$, $R_6$ and $R_7$ may be the same or different and may be alkyl, e.g., methyl, ethyl, propyl, butyl, octyl, dodecyl, cycloalkyl or aryl, etc., and may be substituted with fluoro groups. $R_7$ may also be —$(CH_2)_m$—$CF_3$; m is an integer from 0 to 20, and n is an integer from 1 to 5,000; a copolymer of (I) with other polysiloxanes such as polydimethylsiloxanes and similar alkyl, aryl or alkyl-aryl siloxanes, or polymethyl-3,3,3-trifluoropropyl siloxanes of Formula I wherein n is an integer from about 5 to about 500, and silanol terminated derivatives of the polyfluoroalkylsiloxane.

A second embodiment of the invention relates to a method of forming a composition of matter comprising a cross-linked thermoset resin and from about 0.01% to about 5%, weight, of an additive comprising a polyfluoroalkylsiloxane, said additive having a lower surface energy than that of said resin; said method comprising intimately admixing with a cross-linkable thermosetting resin providing composition (I) a polyfluoroalkylsiloxane (PFAS) having the formula:

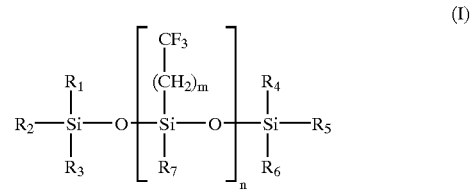

wherein $R_1$, $R_2$, $R_3$, $R_4$, $R_5$, $R_6$ and $R_7$ may be the same or different and may be alkyl, cycloalkyl or aryl; $R_7$ may also be —$(CH_2)_m$—$CF_3$; m is an integer from 0 to 20, and n is an integer from 1 to 5,000; or a silanol terminated derivative of said polyfluoroalkylsiloxane or a copolymer of said polyfluoroalkylsiloxane with an alkyl, aryl or alkyl-aryl-siloxane, followed by subjecting said mixture to conditions which produce a cross-linked thermoset solid resin wherein the concentration of said additive through a cross-section of said solid composition is lower in the interior thereof and higher at the surfaces thereof.

A further embodiment of the invention provides a composition of matter comprising (1) a cross-linked thermoset resin and (2) from about 0.01% to about 5%, by weight, based on the total weight of the composition of a polyfluoroalkylsiloxane having the formula:

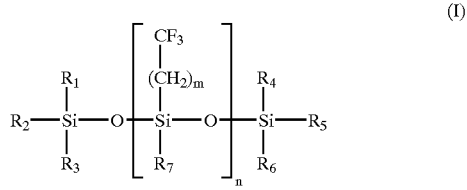

(I)

wherein $R_1$, $R_2$, $R_3$, $R_4$, $R_5$, $R_6$ and $R_7$ may be the same or different and may be alkyl, cycloalkyl or aryl; $R_7$ may also be —$(CH_2)_m$—$CF_3$; m is an integer from 0 to 20, and n is an integer from 1 to 5,000; or a silanol terminated derivative of said polyfluoroalkylsiloxane or a copolymer of said polyfluoroalkylsiloxane or a copolymer of said polyfluoroalkylsiloxane with an alkyl, aryl or alkyl-aryl-siloxane;

wherein the concentration of said polyfluoroalkylsiloxane through a cross-section of said composition is lower in the interior thereof and higher at the surfaces thereof.

DETAILED DESCRIPTION OF THE INVENTION

In the phrase, "concentration of additive is a gradient through a cross-section from a lower value at the interior thereof to a higher value at the surfaces," the term "gradient" is not intended to suggest that the concentration varies uniformly from the interior or center of the composition to the surface. Although this may be the case with respect to some combinations of polymer and additive, typically a much higher concentration of the additive is found at the surfaces of the composition with a much smaller amount in the interior or bulk of the polymer.

This higher concentration of additive at the surface of the polymer enables the provision of a polymer composition having heretofore unattainable properties. Thus, using very low concentrations of additive below 1.0%, relatively high concentrations are attainable at the surface.

The high concentrations of additive at the surfaces provide compositions having the advantages of PFAS-like surface properties, i.e., greater hydrophobicity, lower surface energy, non-adherent surface characteristics, more chemically inert, lower friction, smoother, etc. In addition, the presence of the additive enhances molding operations since it reduces "sticking" of the composition to the mold surfaces and enhances mold release. Also, the additive will, because of the lubricant properties thereof, permit higher speed processing of extruded objects, i.e., films, fibers and other objects formed therefrom and with smoother surfaces, with the added benefits of shorter injection molding cycles and higher extrusion rates.

For biological or biomedical applications of the polymer compositions, the PFAS surfaces are especially advantageous since they exhibit superior biocompatibility in contact with tissue surfaces, cells, physiological fluids and blood as compared with most thermoset polymers.

For the most part, the basic bulk mechanical, physical and chemical properties of the thermoset polymer employed are retained or even enhanced for the compositions of the present invention, but acquire the PFAS surface properties of the additive due to the above-noted gradient concentration of the additive through a cross-section of the composition from a lower value in the bulk to a higher value at the surface. This makes the compositions of this invention also advantageous for molds such as those used for optical and electronic parts and for electro-optical or electro-mechanical devices which require low surface energy and low friction surfaces.

The lower concentrations of additive in the interior portion of the thermoset polymer can also advantageously modify the bulk mechanical, physical and chemical properties of the polymer, however, particularly with respect to the classes of thermoset polymers discussed hereinbelow.

A unique advantage associated with the compositions of the invention is that if cut into plural sections, the additive in the interior will migrate to the new surfaces formed by the cutting operation.

A wide variety of thermoset polymers may be utilized in the practice of the invention, as follows:

I. Unsaturated cross-linkable alkyl and aryl polyesters and poly-carbonates, e.g., diallyl phthalate and diallyl isophlate polymers; diethylene glycol bis(allyl carbonate); bis(phenol) A bis(allyl carbonate).

II. Bismaleimides, e.g., methylene dianiline-based bismaleimide.

III. Epoxy resins, e.g., bisphenol A-epichlorohydrin; polyglycidyl ethers of 1,4-butanediol; neopentyl glycol, trimethylolpropane or higher functionality polyols; epoxy phenol and cresol novolacs; cycloaliphatic epoxy resins.

IV. Phenolic resins, e.g., phenol-formaldehyde resins.

V. Unsaturated polyesters, e.g., maleic anhydride/glycol (ethylene, propylene, diethylene, dipropylene or neopentyl glycols).

VI. Cross-linkable polyimides.

VII. Cross-linkable polyurethanes, e.g., polyisocyanate/polyol condensation products.

VIII. Silicones, elastomer and semi-rigid polymers based on

IX. cross-linkable alkyl and aryl silicones, (e.g., poly(dimethyl-siloxane).

X. Synthetic and natural rubbers, e.g., polyisobutylene, cis-1,4-polyisoprene, cis-1,4-polybutadiene, styrene-butadiene random copolymer, styrene-butadiene block copolymer, polychloroprene, butadien-acrylonitrile random copolymers, XI. all of which may be vulcanized.

XII. Cross-linked polyaryletherketones.

Thermoset furan resins.

The selection of a particular PFAS will depend, of course, on the intended applications of the resultant composition.

Generally, it is preferred that the additive have a lower surface energy, by more than about 5 dynes/cm, as compared with the polymer with which it is compounded.

It is a particularly advantageous feature of the present invention that extremely small amounts of additive may be incorporated in the thermoset polymer to achieve the highly unusual and desirable properties associated with the compositions of the invention.

By Ensuring that the mixing step results in an initially homogeneous admixture of the ingredients, one is able to obtain, upon forming the thermoset resin composition, a solid composition having the above-described gradient concentration. If the ingredients are not homogeneously admixed, the product will comprise a composition wherein a substantial amount of unmixed free fluorocarbon additive simply coats the surface of the polymer. Because of the incompatibility of the PFAS-additive and the difference in surface energies between the polymers and the PFAS additive, the latter will not readily diffuse into and penetrate the polymer to any appreciable extent. Relatively uniform dispersion of the additive throughout the polymer during preparation requires homogeneous blending.

To facilitate admixing of the PFAS additive with the resin forming composition where the latter is in solid form, it is preferred to mix the additive into fluid premixers of pre-polymers or cross-linkable resin composition. Cross-linkable prepolymers, i.e., phenolics or epoxies in the form of small particles such as pellets or powders may be used advantageously. This ensures uniform dispersion of the additive in the fluid prepolymer or efficient wetting of polymer particle surfaces prior to curing, thereby accomplishing efficient dispersion of the additive throughout the polymer.

In a preferred embodiment, the PFAS additive is premixed with a fraction of fluid or pelletized prepolymer and then admixed with the remainder of the polymer and subsequently intimately admixed therewith.

We claim:

1. A mixture comprising (1) a cross-linkable thermosetting resin providing composition and intimately admixed therewith, (2) from about 0.01 to 5%, by weight, based on the weight of the mixture of an additive comprising a polyfluoroalkylsiloxane, said additive having a lower surface energy than that of the thermoset resin formed by cross-linking said composition; said additive being a polyfluoroalkylsiloxane having the formula:

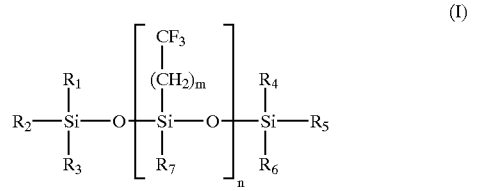

(I)

wherein $R_1$, $R_2$, $R_3$, $R_4$, $R_5$, $R_6$ and $R_7$ may be the same or different and may be alkyl, cycloalkyl or aryl; $R_7$ may also be —$(CH_2)$-$mCF_3$; m is an integer from 0 to 20, and n is an integer from 1 to 5,000;

or a silanol terminated derivative of said polyfluoroalkylsiloxane;

wherein the concentration of said polyfluoroalkylsiloxane through a cross-section of the mixture is lower in the interior thereof and higher at the surfaces thereof.

2. A mixture according to claim 1 wherein said additive is a polytrifluoropropylmethylsiloxane or a copolymer of said polytrifluoropropyl methylsiloxane.

3. A mixture according to claim 1 wherein each of said alkyl groups are methyl, ethyl, propyl, butyl, octyl or dodecyl.

4. A method of forming a composition of matter comprising a cross-linked thermoset resin and from about 0.01 to 5%, by weight of an additive comprising a polyfluoroalkylsiloxane, said additive having a lower surface energy than that of said resin; said method comprising intimately admixing with a cross-linkable thermosetting resin providing composition (I) a polyfluoroalkylsiloxane having the formula:

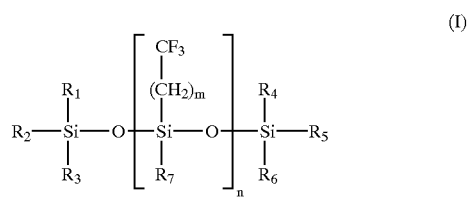

(I)

wherein $R_1$, $R_2$, $R_3$, $R_4$, $R_5$, $R_6$ and $R_7$ may be the same or different and may be alkyl, cycloalkyl or aryl; $R_7$ may also be —$(CH_2)$m-$CF_3$; m is an integer from 0 to 20, and n is an integer from 1 to 5,000;

or a silanol terminated derivative of said polyfluoroalkylsiloxane or a copolymer of said polyfluoroalkylsiloxane;

followed by subjecting said mixture to conditions which produce a cross-linked, thermoset solid resin wherein the concentration of said additive thorough a cross-section of said composition is lower in the interior thereof and higher at the surfaces thereof.

5. A method according to claim 4 including a preliminary step of forming a pre-mix comprising a fractional portion of said cross-linkable thermosetting resin composition (I) in particulate form substantially uniformly wetted with said polyfluoroalkylsiloxane and mixing said wetted first fraction with the remainder of said cross-linkable thermosetting resin composition (I).

6. A method according to claim 4 wherein each of said alkyl groups are methyl, ethyl, propyl, butyl, octyl or dodecyl.

7. A method according to claim 4 wherein said polyfluoroalkylsiloxane is a polytrifluoropropylmethylsiloxane or a copolymer of said polytrifluoropropylmethylsiloxane.

8. The composition of matter produced by the method of claim 4.

9. A composition according to claim 8 wherein each of said alkyl groups are methyl, ethyl, propyl, butyl, octyl or dodecyl.

10. A composition according to claim 8 wherein said polyfluoroalkylsiloxane is a polytrifluoropropylmethylsiloxane or a copolymer of said polytrifluoropropylmethylsiloxane.

11. A composition of matter comprising (I) a cross-linked thermoset resin and (2) from about 0.01 to 5%, by weight, based on total weight of the composition of a polyfluoroalkylsiloxane having the formula:

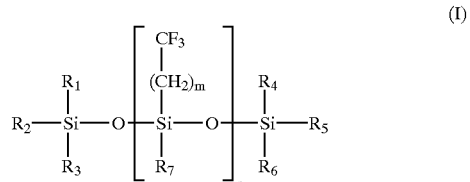

(I)

wherein $R_1$, $R_2$, $R_3$, $R_4$, $R_5$, $R_6$ and $R_7$ may be the same or different and may be alkyl, cycloalkyl or aryl; $R_7$ may also be —$(CH_2)$-$mCF_3$; m is an integer from 0 to 20, and n is an integer from 1 to 5,000;

or a silanol terminated derivative of said polyfluoroalkylsiloxane;

wherein said polyfluoroalkylsiloxane or said silanol terminated derivative thereof having a lower surface energy than that of said resin the concentration of said polyfluoroalkylsiloxane through a cross-section of said composition is lower in the interior thereof and higher at the surfaces thereof.

12. A composition according to claim 11 wherein each of said alkyl groups are methyl, ethyl, propyl, butyl, octyl or dodecyl.

13. A composition according to claim 11 wherein said polyfluoroalkylsiloxane is a polytrifluoropropylmethylsiloxane or a copolymer of said polytrifluoropropylmethylsiloxane.

* * * * *